Patented Aug. 6, 1940

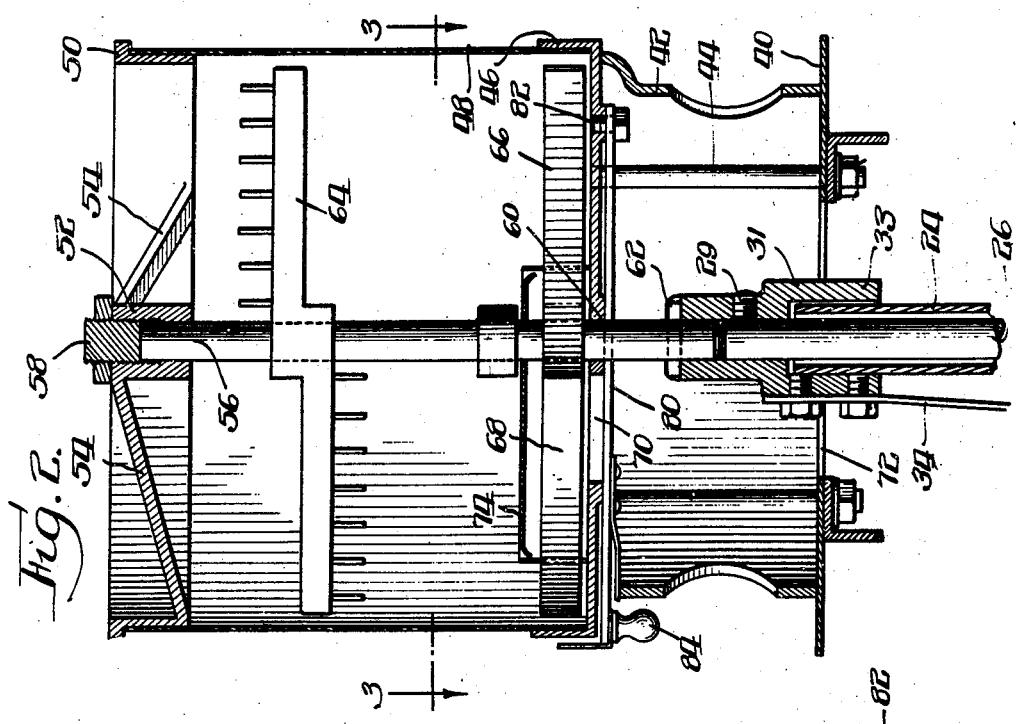

2,210,719

UNITED STATES PATENT OFFICE 2,210,719

PROCESS AND APPARATUS FOR FILTERING ALCOHOLIC BEVERAGES, FOOD PRODUCTS, AND LIKE LIQUIDS

Squire C. Hodges, San Francisco, Calif., assignor to S. F. Bowser & Company, Inc., Fort Wayne, Ind., a corporation of Indiana Application October 16, 1935, Serial No. 45,302

6 Claims. (Cl. 210—181)

This invention relates to a process and apparatus for filtering alcoholic beverages, nonalcoholic beverages, liquid food products, and like liquids.

Among the objects of my invention are to provide a continuously operating process and apparatus for filtering liquids of the foregoing characteristics and particularly fresh wine as it comes directly from the clarification tank, wherein objectional suspended bodies are completely, efficiently, and quickly removed before they have time to impart undesirable characteristics to the liquid and particularly to wines and similar liquids;

To provide a method and apparatus wherein liquids of the foregoing characteristics and particularly wines may be filtered over relatively long, continuous cycles of operation without the necessity of arresting the operation to clean the filter or stop the filtering process;

To provide a filter and filtering process for the hereinbefore described liquids wherein the continuity of the filtering process is not interrupted due to the practically continuous addition to the liquid of sufficient amounts of filtering material, such as filter aid, and in such a way as to maintain the efficient porosity of the coating upon the filter plates;

To provide a filtering apparatus and process therefor for filtering liquids of the foregoing characteristics wherein the apparatus is adaptable for connection to a source of liquid located either above or below the level of the filtering apparatus and whereby a continuous uninterrupted feeding of fresh liquid to be filtered to the apparatus is provided for in a simple, inexpensive, and automatic manner;

To provide filtering mechanism of the foregoing characteristics which may be readily and inexpensively and quickly cleaned and washed between filtering operations;

To provide a filtering apparatus of the foregoing characteristics wherein the fluid connections may be shifted first to provide a closed system for uniformly and efficiently coating the filter plates with filter aid or the like and wherein thereafter the system may be quickly and conveniently changed to continuously run fresh liquid to be filtered directly through the coated filter plates to a point of discharge and by further adjustments thereafter to discharge into a suitable retainer that portion of the liquid left in the filter and which it is adapted to retain and thereafter by simple adjustments to wash the filter and condition it for a subsequent precoating operation;

To provide a simple process and apparatus for maintaining a continuous supply of fresh liquid in the filtering system, for example, fresh wine, and in thoroughly and uniformly mixing therewith a desired quantity of filter aids and utilizing in a novel manner the liquid so laden with filter aid as a carrier for uniformly distributing and applying the filter aid to the filter plates and thereafter returning such liquid back to the system in a continuous cycle to again pick up filter aid;

To provide a novel type of mixing chamber to be used in a filtering system wherein filter aid may be applied to the liquid therein either as a batch or in regulable amounts and in a manner such that the amounts are supplied in a substantially or practically continuous manner as the process progresses;

To provide a novel type of either float feed control of the fresh liquid to the system and/or an ejector-operated feeding control for the system;

To provide an improved apparatus for applying the filter aid as a coating to the filter plates whereby the filter aid is applied in a uniform manner and substantially continuously;

To provide a filtering system wherein a liquid to be filtered and containing filter aid is forced through the filter in one direction during the filtering operation or during the precoating operation and wherein the liquid is sucked out of the filter in the opposite direction during an emptying process and wherein means is provided for either permitting the air in the filter to exhaust during the first mentioned operation or to permit it to enter the filter during the second mentioned operation; and To provide a process for removing impurities from fresh wine which comprises directly filtering the wine in a continuous manner as it comes fresh from the clarification tank and in a process whereby all objectionable impurities are immediately and continuously removed therefrom without the necessity of storing the wine prior to the filtering operation.

These and other objects of my invention will be apparent from a perusal of the following specification taken in connection with the accompanying drawings wherein:

Figure 2 is a sectional view taken through the apparatus for adding filter aid to the mixing tank;

Figure 3 is a section on line 3—3 of Figure 2; and

Figure 4 is a plan view of the cut-off blades used in connection with the apparatus shown in Figure 2.

Figure 1:
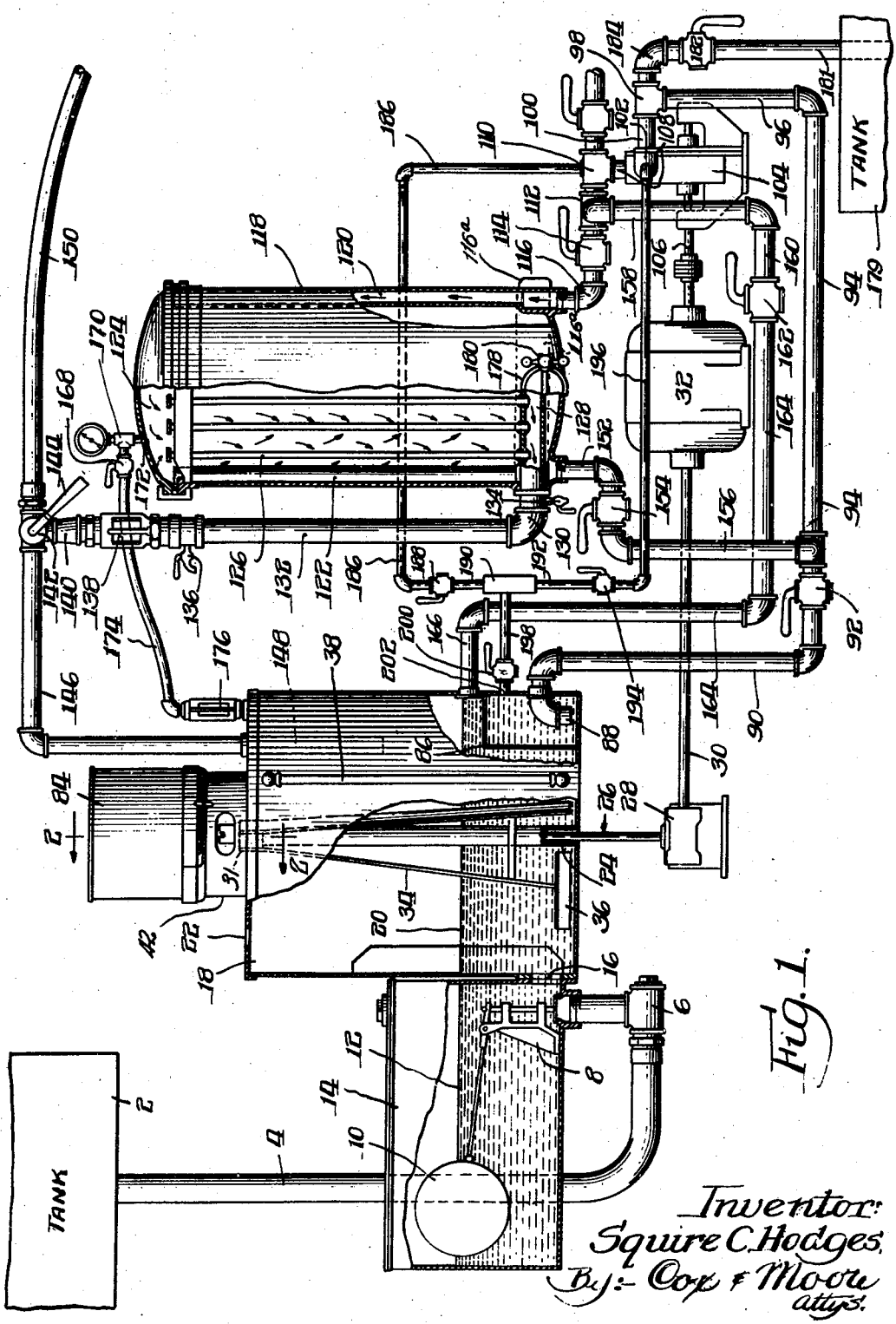
Figure 1 is a view somewhat diagrammatical of the system and apparatus for carrying out my improved process.

Referring now to the description of the invention in detail, my improved process is in general applicable to the filtering of alcoholic and non-alcoholic beverages including wine, beer, whiskey, and including the usual run of non-alcoholic beverages, and other liquid food products and like liquids. For the purposes of convenience and in order to explain the peculiar adaptation of the invention to certain types of alcoholic and non-alcoholic beverages, I shall explain the invention in connection with the filtration of wine. It is understood, however, that the invention is not so limited except as to those claims in which the invention is expressly limited to the filtering of wine.

When my invention is utilized in connection with the filtering of wine, the system is provided with a direct connection to the clarification tank of the wine maker. This tank is generally of very large capacity, as for instance, 30,000 gallons. I have illustrated such a tank 2 at the upper left hand portion of the drawings and as having a connection 4 to a valve 6 controlled by any type of float control means 8, the float 10 of which is in a body of wine or other liquid 12 in a float tank 14. The float thus controls the level of wine or other liquid in this tank 14.

An opening 16 in this tank communicates with a mixing tank 18. The level 20 of the wine in the tank will seek the wine level in the tank 14. Any type of agitating means or mixing means may be provided for the tank 18 in order to thoroughly mix the wine or other liquid therein with a desired amount of filter aid or other filtering material. In certain instances, filter aid may be introduced into this mixing chamber 18 through an opening 22 at the top thereof. In other instances, I provide means for automatically introducing into the mixing chamber predetermined amounts of filter aid which will be added in a substantially continuous manner in order to automatically maintain a desired proportion or relation between the wine or the liquid in the mixing chamber and the filter aid, it being understood that the filter aid will be carried by the wine through a portion of the system to the filter for precoating the filter.

In the present instance I desire to provide an improved type of mixing means for the chamber 18. In general I construct it in the manner shown in Figures 1 and 2 wherein the tank 18 is provided with a central column 24 extending from the bottom up to the top of the chamber and forming a tubular sleeve centrally of the tank. Through this sleeve projects a shaft 26 having a gear connection 28 to a shaft 30 driven by a motor 32. The upper portion of the shaft 26 above the tube 24 has affixed or splined thereto as at 29 a sleeve or collar 31 which depends downwardly as at 33 and carrying a plurality of mixing blades 34 which have mixing feet or agitators 36 depending from their bottom ends and extending downwardly into the liquid in the tank 18 so that upon rotation of the shaft 26 the blades will be rotated thoroughly to agitate the liquid or wine 20 in the tank 18 and uniformly distribute therein the filter aid introduced as hereinafter described.

The tank 18 is provided with a sight glass 38 for instantly showing the liquid level therein. It will be appreciated that by means of the foregoing construction I have eliminated any opportunity for any abrading action to take place between the filter aid and any rotatable portion such as a bearing in the mixing device.

In addition to the hand opening 22 for introducing a batch of filter aid in the mixing tank 18, I provide means for uninterruptedly, continuously introducing into the mixing chamber regulable and predetermined amounts of filter aids or the like whereby during the continuity of the filtering cycle, as fresh wine or liquid to be filtered is continuously passing through the filter and having the impurities or objectionable solids therein removed, I may continuously add to such fresh liquid in a continuous manner or substantially continuous manner desired amounts of filter aid whereby I may then mix the filter aid with this fresh liquid and then utilize the liquid as a carrier to uniformly distribute the filter aid as a coating upon filter plates. In this way large volumes of fresh liquid such as fresh wine coming from a clarification tank may be continuously and immediately filtered so that it is not necessary to store the wine or other liquid for long periods after preliminary clarification before filtering, thereby saving time, and substantially decreasing the cost of manufacture of wine through the continuity of the process, the elimination of unnecessary holding tanks, and the expedition of the process.

One form of my apparatus for adding filter aid continuously to the mixing tank is shown specifically in Figures 2 and 3 of the drawings. In the preferred embodiment it comprises in general a plate-like support 40 adapted to fit directly into an opening in the central portion of the mixing tank 18. This plate is provided with an upstanding cylindrical barrel portion 42 to which is bolted as at 44 a base 46 for the mixing chamber cylinder 48, the upper portion of which receives a head or top 50 forming a central bearing 52 and having spiders 54. The central bearing 52 receives a shaft 56 and a closure plug 58 therefor. The shaft 56 at the opposite end passes through a bearing 60 in the base plate 46 and the shaft is pinned or otherwise connected as at 62 to the rotatable collar 31 driven by shaft 26 so that rotation is imparted to an agitator or distributing blade 64 fixed on shaft 56 as shown. The lower portion of the shaft 56 carries a scraper blade 66 of the general outline shown in Figure 3 and it preferably comprises two diametrically opposed, preferably curved, arms 68 fixed to shaft 56. These arms are so curved that in rotation they tend to sweep the filter aid from the bottom of the hopper 48 and gradually work or force it to an opening 70 in the base plate 46 and through which the filter aid will pass through an opening 72 in the plate 40 into the mixing chamber 18.

The blade 66 is elevated slightly from the base plate 46 whereby to prevent clogging or caking of the filter aid above the opening 70. In addition there is provided across hopper 48 a baffle plate 74 which is fixed to the sides of the cylinders at 76 and 78. The baffle plate is disposed above the scraper blade 66.

For control purposes a gate or cut-off 80 is pivotally mounted as at 82 to the bottom 46 of the hopper and is swingable by means of a handle 84 to open and close the opening 70 through which the filter aid is discharged into the mixing chamber. This constitutes an adjustable hand control for nicely controlling the amount of filter aid fed into the mixing chamber from the hopper. Upon rotation of the shaft 56 the agitating member 64 will thoroughly spread the filter aid in the hopper which will then pass downwardly into the path of movement of the forcing blades 68 which will then force it in a continuous manner toward the discharge aperture 70, the opening of which may be closely regulated.

Thus, it will be seen that the wine or other liquid in mixing tank 18 may be continuously supplied by power means with a desired amount of filter aid and that the liquid and the filter aid will be continuously agitated to provide a uniform mixture. The wine thus laden with filter aid will then pass through a screen 86 and thence through a discharge outlet 88 connecting with a pipe 90 having a valve 92 therein, the wine or the liquid passing through pipe 94 and pipe 96 to a T-connection 98, thence by way of short pipe 100 to the suction connection 102 of a rotary pump 104 which in turn is driven from a shaft 106 connected to the motor 32. From the discharge side of the pump, the wine thus laden with filter aid is discharged by means of pipe 108 to a second T-joint 110, means to a third T-joint 112 past a valve 114 to a pipe 116 connecting with the filter 118. It will be noted that inlet channel 116a passes around the bottom of the filter 118 to diametrically opposite points so that the liquid entering the channel is delivered in two streams 120 and 122 to the upper portion of the filter tank which is closed by means of a removable cover forming a distribution space or chamber 124. From this point the liquid passes downwardly on opposed sides of the usual filter plates 126, passes through the filter plates and then downwardly through the space between the filter plates to a bottom discharge manifold 128.

It is understood that the filter herein illustrated somewhat diagrammatically may be of any general type provided the filter aid with the liquid carrier is introduced at the top of the filter to take advantage of the natural gravity drop of the filter aid as it passes along the filter plates and whereby as the wine is thus pumped through a filter, the filter aid will be spread uniformly across the filtering surfaces from the top downwardly so that a uniform distribution of the filter aid over all of the filtering surfaces is obtained, whereby the necessity for depositing filter aid at the bottom of the filter is avoided and whereby likewise, due to the uniformity of the application and distribution of the filter aid over the entire superficial area of the filter, a uniform filtering is obtained. Likewise, due to the fact that the fresh liquid arriving to be filtered laden with the desired amount of filter aid is continuously passing through the filter in the above described manner, the filter cake is continuously being built up and fresh porosities are being provided which will prevent the accumulation of undue amounts of slime or other impurities tending to obstruct filtration.

The particular type of filter which is illustrated herein is shown in detail in Patent 1,919,448 or in like filters now manufactured by the S. F. Bowser & Company, Inc., of Fort Wayne, Indiana, known as "Bowser Figure 900" or "Bowser Figure 674." It is understood, however, that other types may be utilized provided they will fill the functions hereinabove described.

From the manifold 128 the liquid passes through pipe 130 to a pipe 132. Pipe 130 is provided with a small valve 134, if desired, as is also pipe 132 provided with a small valve 136. From pipe 132 the liquid passes through a sight glass 138 used in determining the clarity of the liquid passing therethrough. From the sight glass the liquid passes through pipe 140 to a T-connection 142 provided with a three-way valve 144. In one setting of the valve the liquid passes to a pipe 146 which discharges at 148 into the mixing tank 18. In another setting of the valve the liquid will pass to a discharge pipe 150 which conducts the liquid to a desired point.

In the pre-coating operation of my apparatus for carrying on my process, liquid such as fresh wine arriving from the clarification tank will pass into the float chamber 14 and thence through opening 16 and into mixing tank 18. The motor 32 goes into operation, the agitating blades 34 and mixing feet 36 are in operation. A predetermined batch or amount of filter aid has been added to the mixing tank through the opening 22. When the level in the mixing tank has risen to the desired point, the liquid may pass through pipe 90 to the suction side of the pump and thence to the filter, carrying the filter aid therewith and depositing it upon the filter surfaces. The liquid continuing to pass through the filter will then be conducted by pipe 132 past the sight glass, through three-way valve 144 back through pipe 146 to the mixing tank in the continuous cycle. This cyclical operation will continue until the wine or other liquid passing through the sight glass 138 becomes clear. Depending upon the nature of the liquid, and depending particularly upon the nature of the alcoholic liquid, for instance wine, the process will be continued from three to five minutes.

It will be understood that in the charging of the tank 18 with liquid the float control, the tank 14, will continue to operate until the tank 18 and the filter is full. In this condition the mixing tank will not be wholly full but its level will be that of the float chamber 14 and vice versa. After the completion of the pre-coating and when the three-way valve 144 is turned, the process will then be continued as a continuous process because then the liquid will be passed from the filter to the discharge pipe 150 instead of being returned back to the mixing tank. As soon as this occurs the level of the liquid in the mixing tank 18 drops, the float tank will admit automatically sufficient liquid to replace the liquid which is constantly being discharged from the pipe 150 and since the liquid is continuously passing from the mixing tank to the filter and from the filter to the discharge pipe 150, and since the filter aid is being continuously added to the fresh liquid as it enters the mixing tank, the fresh liquid thus laden with filter aid will pass continuously through the filter, will continuously pre-coat the filter plates, and will be continuously filtered and discharged. After the pre-coating has been completed as hereinbefore described and when a fresh batch of liquid is introduced into the mixing tank 18, it is preferred to immediately add a relatively large amount of filter aid through opening 22 to immediately preserve the desired proportion between the volume of liquid in the tank and the amount of filter aid therein, thereafter, the addition of the filter aid may be taken care of automatically by operating the control member 84 on the hopper.

After the continuous process of filtering has been run for a number of hours, it may be desirable to clean the filter. In order to accomplish this, it is first necessary to discharge the residual liquid in the filter back into the mixing tank 18 since such residual liquid has considerable value. To do this, a pipe 152 is connected to the bottom 128 of the filter. This pipe 152 is provided with a valve 154 connecting with an additional pipe 156 which in turn connects with pipe 94 leading to the suction side 102 of the pump. In addition the joint 112 is provided with a pipe 158 connecting with a second pipe 160 having a valve 162 connecting with additional pipe 164, discharging as at 166 into the mixing tank 18 so that by closing the valves 92, 114 and 144 and by opening valves 154, 162 and 168, the pump in operation will draw liquid from the bottom of the filter through pipe 152, valve 154, pipe 156, pipe 94, pipe 96, T-joint 98, pipe 100, through the pump pipe 108, T-joint 110, pipe 158, pipe 160, valve 162, pipe 164, and pipe 166. Thus the residual liquid will be discharged into the mixing tank. During this time it is necessary to open a valve 168 connected to a pressure gauge 170 and having a connection 172 to the top of the filter and which valve 168 has a further connection 174 to a sight glass 176 connected to the upper portion of tank 18 and also to air, so that when the pump is sucking residual liquid from the bottom of the filter and discharging it into the tank 18, the valve 168 will permit air to flow into the top of the filter to break any vacuum which might be caused by the suction of the pump. Conversely, when the filter is first put into operation and when the pump starts pumping liquid from the mixing chamber into the filter, the same valve 168 will be open to permit air to pass through the pipe 174, sight glass 176, chamber 18, and opening 22. The valve 168 is partly closed immediately the sight glass 176 shows that liquid has reached this point, to such a degree that only a small stream of liquid passes through sight glass 176. This prevents air from accumulating at the top of the filter.

The bottom of the filter is provided with the usual cleaning opening 178 so that when the liquid has been removed from the bottom of the filter and the valve 154 is closed and valve 114 closed, the top may be removed from the filter and water may be forced therein to clean the plates, the water and other objectionable foreign matter being washed out through the opening 178. It is understood that it has a suitable closure 180.

In some positions it is found desirable to draw liquid to be filtered from a tank lower than or removed some distance from the filter and the tank 18. Such a lower tank is shown at 179 connected by a pipe 181, a valve 182, and an elbow 184, to the T connection 98, and thence to the suction side of the pump 104. When the several valves are properly set the liquid is drawn from tank 179 and filtered in the manner heretofore described.

During such operations it is necessary to pass liquid carrying filter aid from tank 18 to filter 118 in order to build up filter cake on the filter plates. For this purpose a short pipe 202 leads from an aperture in the wall of tank 18 below the normal level of the liquid therein to a valve 200. From the valve 200 another pipe 198 leads to the middle connection of an ejector 190. The forced input into the ejector is through a pipe 186 arising from the T connection 110 which is attached by pipe 108 to the discharge side of the pump 104, through a valve 188, and into the top of the ejector 190. From the bottom of the ejector a pipe 192, a valve 194, and a second pipe 196 are adapted to carry liquid and filter aid to the suction side of the pump. When the pump is in operation, if valves 188 and 194 are opened liquid will be driven in a complete circuit through pipes 186, 192, and 196, and pass through the ejector 190. In the ejector the speed of motion of the passing liquid is increased in the customary way, and when valve 200 is open liquid and filter aid from tank 18 is drawn into the low pressure zone in the ejector and so added to the fluid circulating in the ejector system. The fluid from the ejector system is mixed in the pump with fluid from tank 179, adding filter aid thereto. Valve 168 is opened to return to tank 18 an amount of fluid equal to that removed. Some filter aid is returned with the fluid to tank 18, but the amount is smaller than the amount removed. When the device is operated in this manner the sight glass 176 will show constantly the condition of the liquid being pumped into the header of the filter. At the same time the sight glass 138 shows the condition of the liquid after it passes through the filter. When the sight glass 176 is to be used during the filtering of liquid from tank 2, taken directly from tank 18, valve 168 may be opened and the ejector system likewise opened, valve 168 allowing a portion of the liquid and filter aid to pass back through glass 176 to tank 18.

By adjustment of valves 92, 154, 162, and 114 the pump can be caused to pump liquid into tank 18 rather than through the filter.

Referring again to the operation of my improved apparatus, it was seen that the unfiltered wine or other liquid flows from the storage or clarification tank through the inlet pipe into the float control tank where the liquid level is kept constant by the float valve; the liquid then flows into the slurry or mixing tank where the liquid is mixed with the filter powder automatically fed from the powder feeder, the amount being controlled or predetermined by the adjustable control member; the agitator blades thoroughly mix the wine or liquid with the filter aid in a manner that can be determined through the sight glass and the slurry then passes through the strainer into the suction line as controlled by the valve in said line, then into the discharge line, through the valve in that line, and then into the filter for both pre-coating and filtering. The wine or liquid flows upwardly through the riser inlet tubes into the filter, passes through the pre-coated Monel metal screen plates of the filter, flows downwardly into the filtered wine manifold and then upwardly into the filter discharge line which is controlled by the three-way valve therein, the wine or liquid passing either back to the slurry tank as hereinbefore described or to the filter discharge pipe. The quality of filtration may be observed through the illuminated sight glass. The system is thoroughly provided with drain cocks for thoroughly draining the pump, the pipe lines, etc., for cleaning. In order to pre-coat the filter screens in operating the system, I first open the valve in the supply line from the wine supply tank or clarification tank, allowing the wine to enter the float control chamber and slurry mixing tank. I then open the suction valve from the slurry mixing tank and the discharge valve into the filter. At the same time the filter discharge valve is set to return back to the slurry mixing tank the liquid therein. The air release valve is also open. There is then introduced into the slurry tank about four pounds, for example, of filter aid which is put directly into the wine in the slurry mixing tank. The pump is then started. When the filter is full of wine and all air is discharged, the air release valve is partly closed and the wine is allowed to circulate until the filter aid is all deposited on the filter plates and the wine shows clear in the sight glass.

The three-way valve in the discharge line from the filter is then set to deliver filtered wine to the discharge outlet. At this time approximately, for example, two more pounds of filter aid is added directly into the slurry tank and the automatic powder feed control is regulated to feed filter aid as required to maintain a porous filter cake and prevent excess pressure.

Filtration is permitted to continue until the pressure gauge shows between forty-five to fifty pounds, for example, at which pressure cleaning of the filter is advisable which may best be accomplished as follows:

To clean and recharge the filter, the pump is first stopped; then the suction valve from the filter is opened as is also the discharge valve to the slurry tank, likewise the air release valve. I then close the necessary valves in the various lines, start the pump to transfer wine left in the filter back to the slurry tank. When the wine in the filter has been discharged, I stop the pump, close the valve 154, and immediately open the filter clean-out cover, and filter cover. I then use a hose to flush out all sludge and thoroughly wash all coating from the filter plates. I then close the filter cover and clean-out cover which completes the cleaning operation. I then continue filtering following the method hereinbefore described.

In order to operate my process when changing from red wine to white wine or in the treatment of other like materials or when any filtering operation has been completed, I wash the filter as above described, turning the clear water into the slurry tank. At this time I start the pump, fill the filter, and circulate water through all the suction and discharge lines and valves, open the clean-out cover, filter cover, and all drain cocks, then thoroughly flush the filter and slurry tank and allow all parts of the unit to drain. In no event is the water ever permitted to get into the dry powder feed.

For operations involving the polishing of wine and similar treatment of other liquids, I follow the same method, the only difference being in the kind of filter aid powder used. In this event I add shredded asbestos in desired proportions.

It will be seen that the foregoing method and apparatus is extremely flexible and efficient, eliminating considerable effort, time, and labor ordinarily consumed in filter cleaning of liquids, at the same time producing a filtration of the highest quality in addition to providing complete sanitation.

It is understood, of course, that the addition of any particular amount of filter aid to a batch or when automatically adding the filter aid to the slurry tank, the amount added is always determined by the volume of liquid to be filtered. In the example given, wherein two pounds of filter aid was added, the volume of liquid filtered was approximately 750 gallons per hour. The proportions of filter aid will necessarily vary with the rate of flow and also the type of liquid to be filtered and in some instances the type of filter aid used.

Having thus described my invention, what I claim as new and desire to obtain by Letters Patent of the United States is:

1. In a filtering apparatus the combination of a mixing chamber, a filter, a pump, a pipe connecting the mixing chamber to the inlet side of the pump, a pipe connecting the discharge side of the pump with the upper portion of the filter, said filter having vertically arranged filtering means therein, a pipe connecting the bottom of the filter with either the mixing chamber or the discharge line, a valve controlling said pipe to divert the filter discharge either to the mixing chamber or to the discharge line, means connected to the inlet side of the pump and connected to a source of liquid disposed below the level of the pump, the filter and the mixing chamber, a second pipe connecting said filter with the mixing tank, an ejector, a pipe from the mixing tank to the ejector, a pipe having a portion of restricted cross section from the ejector to the suction side of the pump, and a pipe having a portion of restricted cross section from the discharge side of the pump to the ejector, said ejector and the pipes connected thereto providing means for drawing liquid from said mixing tank and adding it to the liquid pumped into the filter.

2. In a filtering apparatus, the combination of a mixing chamber, a filter, a pump, means for passing liquid laden with filter aid from the mixing chamber to the filter and from the filter back to the mixing chamber in a cyclical process, a pipe connected to the suction side of the pump and likewise connected to a tank disposed below the pump, filter and mixing chamber, whereby on operation of the pump, liquid will be passed by the pump through the filter through the mixing chamber and back to the suction side of the pump in a cyclical process, means for diverting the discharge from the filter, to a discharge line, means for pumping continuously a relatively smaller amount of liquid from the filter back to the mixing chamber, means for automatically and continuously introducing into the mixing chamber predetermined amounts of filter aid, and means for automatically and continuously withdrawing from the mixing chamber liquid mixed with filter aid and passing it to the filter, said amount being withdrawn being substantially equal to the amount continuously introduced into the mixing chamber.

3. In a filtering system, the combination of a mixing chamber, a filter and a pump, a tank holding liquid to be filtered, said tank being located below the mixing chamber, the filter and the pump, a connection from said tank to the suction side of the pump, means for pumping liquid from said tank to the filter and from the filter to a discharge line, means for pumping continuously a relatively smaller volume of liquid from the filter back to the mixing chamber, means for introducing continuously a predetermined amount of filter aid in the mixing chamber, and means for continuously withdrawing an amount of liquid laden with filter aid from the mixing chamber proportional to the amount of liquid and filter aid constantly supplied to the mixing chamber, said means serving to deliver the same to the filter whereby continuously to build up a filter cake on the filter during the continuous filtering operation.

4. A filtering apparatus comprising a mixing tank, a filter, a pump, a float feed chamber connected to the mixing chamber, said float feed chamber having a valve and a float control therefor, a tank disposed above the elevation of the mixing chamber for feeding liquid to said float feed chamber when the valve is opened, means for feeding filter aid continuously and automatically in desired quantities to said mixing chamber, means connected to the inlet side of the pump and adapted for connection to a tank disposed below the mixing chamber and the filter, means connecting the mixing chamber with the inlet side of the pump, means connecting the discharge side of the pump with the filter, means connecting the discharge side of the filter with the mixing chamber or with the discharge line, and a valve in said last named means for diverting the discharge of the filter either back to the mixing tank or to the discharge line, a second pipe connecting the filter with the mixing chamber, said second pipe having a portion of lesser cross-section than the pipe connecting the discharge of the filter with the mixing tank, a pipe connected to the mixing tank and having a valve therein, said pipe having a connection to an ejector and having a restricted portion of substantially the proportion of the pipe connecting the filter with the mixing tank, a pipe connecting the discharge side of the pump with said ejector and a second pipe connecting the inlet side of the pump with said ejector, both of said pipes having a restricted portion of cross-section substantially equal to the restricted portions of the hereinbefore mentioned pipes, and valves in all of said pipes having restricted cross-sections.

5. In a filtering system the combination of a cylindrical, upstanding filter having a removable top, said filter including a plurality of separate, spaced apart filter leaves extending across the inside of the filter, said filtering leaves having opposed surfaces, and an intervening space for liquid which has passed through the opposed filter leaves, the upper portion of the filter providing a chamber in communication with all of the opposed filtering leaf surfaces, a header at the bottom of the filter in communication with all of the spaces between the filter leaves, and inlet means for said filter comprising diametrically opposed pipes located on the inside of the filter and connected to the upper chamber whereby to feed liquid laden with filter aid in a uniform manner to the chamber so that said liquid will be distributed uniformly to all surfaces of the filter plates at their upper portions and whereby the liquid in passing through the filtering surfaces of all the filter leaves will deposit the filter aid by gravity from the top downwardly in a uniform manner on all of the filtering surfaces.

6. In a filtering system, the combination of a mixing tank, a filter, and a pump, a valved pipe connecting the discharge side of the pump with the filter, a pipe connecting the bottom or discharge side of the filter with the mixing chamber or to a point of discharge, the valve in said last mentioned pipe being adapted to divert the filter discharge either to the mixing chamber or to said point of discharge, a pipe connecting a mixing chamber with the inlet of the pump, a valve in said latter pipe, a pipe connecting the bottom of the filter to said last mentioned pipe, a pipe having a reduced cross-section connecting the upper portion of the filter with the upper portion of the mixing tank, said mixing tank having a discharge into the atmosphere, a valve in said last mentioned pipe, and means for introducing filter aid to said mixing chamber and for feeding liquid to be filtered thereto, said filter having a valve controlled opening at the bottom for cleaning purposes, and a pipe connecting the discharge side of the pump with said mixing chamber, said last mentioned pipe having a valve.

SQUIRE C. HODGES.